United States Patent Office 3,245,915
Patented Apr. 12, 1966

---

3,245,915
COMPOSITION AND METHOD OF INHIBITING CORROSION OF METAL SURFACES IN CONTACT WITH AQUEOUS SURFACE ACTIVE SOLUTIONS
Charanjit Rai and Robert C. Kimble, Crystal Lake, Ill., assignors, by mesne assignments, to Union Oil Company of California, Los Angeles, Calif., a corporation of California
No Drawing. Filed Dec. 17, 1962, Ser. No. 244,921
14 Claims. (Cl. 252—137)

This invention relates to certain novel corrosion inhibitors comprising innermetallic complexes of benzotriazoles, to corrosion-inhibiting compositions containing same, and to the method of inhibiting corrosion using said compounds or compositions containing same.

One of the first members of the five-membered heterocyclic ring compounds with three hetero-atoms comprises the 1,2,3-triazoles, which exist in three tautomeric forms of which the following is of interest herein:

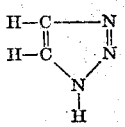

There are many methods of preparing the 1,2,3-triazoles, including the action of hydrazoic acid or its organic derivatives, the azides, on acetylenic substances; the oxidation of phenyl osazones to osotetrazines, which undergo ring contraction in the presence of hot acid; and the action of nitrous acid on o-phenylene diamide to form azimido-benzene, as one form of compound wherein the heterocyclic nucleus is condensed in the ortho-position with a benzene nucleus:

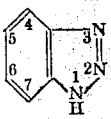

The ring system of the molecule is very stable, even resisting powerful oxidation, and only reducing agents will attack it. The triazoles are very weak bases. The hydrogen atom attached to the nitrogen can be replaced by a metal. Benzo-1,2,3-triazole (aziminobenzene) melts at about 100° C., and the methyl derivative, azimino-toluene melts at 83–84° C.

In accordance with this invention, we have found that small amounts, in the order of about 0.0001 to 0.2 g./100 ml. of solution, of innermetallic complexes of benzotriazoles or naphthotriazoles are effective corrosion inhibitors for aqueous media, especially aerated aqueous media and aerated solutions containing commercial detergents. The compounds of this invention are represented by the formulae:

PENETRATION TYPE (1)
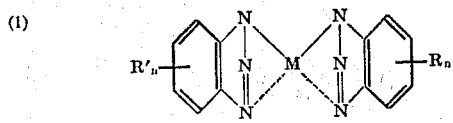

and (2)

and (3)
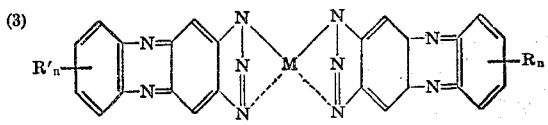

wherein, in Formulae 1–3, M is a metal, R is a substituent group, R' is a substituent group, and $n$ has a value of 0 to 4; R and R' being the same or different substituents from the group consisting of alkyl radicals of 1 to 10 carbon atoms, the group consisting of alkoxy radicals of 1 to 10 carbon atoms, aryl radicals of 6 to 18 carbon atoms, the corresponding alkaryl radicals wherein the alkyl portion has 1 to 10 carbon atoms; the corresponding aralkyl radicals that is having 1 to 10 carbon atoms in the alkyl portion and 6 to 18 carbon atoms in the aryl portion cycloaliphatic hydrocarbon radicals of 3 to 7 carbon atoms, nitro and halogens, and M being copper, nickel or cobalt, in the preferred embodiment of the invention. Compounds of the associated type wherein the above penetration type compounds are associated as positive ions with such negative ions or anions as halides, nitrate, sulfate, phosphate, etc., are also contemplated.

It becomes, then, a primary object of this invention to provide corrosion inhibitors comprising compounds corresponding to Formulae 1 to 3.

Another object of this invention is to provide a method of inhibiting corrosion using compounds corresponding to Formulae 1 to 3.

Still another object of this invention is to provide compositions for use in inhibiting corrosion wherein said compositions include an effective amount of compounds corresponding to Formulae 1 to 3.

An object of this invention is to provide a new use for innermetallic complexes of benzotriazoles and naphthotriazoles as corrosion inhibitors for aerated aqueous solutions in contact with a metal surface.

These and other objects of this invention will be described or become apparent as the specification proceeds.

The compounds or complexes to be used in accordance with this invention are prepared by reacting the corresponding benzotriazole or naphthotriazole with an acidic metal salt in an alcohol solution, followed by the addition of an alkali. Species of benzotriazoles and naphthotriazoles that can be used as starting materials to prepare the innermetallic complexes include but are not limited to:

4-methylbenzotriazole
4-ethylbenzotriazole
4-isopropylbenzotriazole
4-n-propylbenzotriazole
4-n-butylbenzotriazole
4-t-butylbenzotriazole
5-isobutylbenzotriazole
5-methylbenzotriazole
6-ethylbenzotriazole
7-amylbenzotriazole
4-methyl-5-ethylbenzotriazole
4-methoxybenzotriazole
4-ethoxybenzotriazole
5-propoxybenzotriazole
6-butoxybenzotriazole
7-methoxy-8-ethoxybenzotriazole
6-methyl-7-chlorobenzotriazole
5-butoxy-6-fluorobenzotriazole
4-heptyl-5-propoxybenzotriazole
4-pentoxy-6-iodobenzotriazole
4,5-dichlorobenzotriazole
4,6-dibromobenzotriazole
4,7-difluorobenzotriazole
4-phenylbenzotriazole
4-methylnaphthotriazole 4-methyl-5-ethylnaphthotriazole
4-n-propylnaphthotriazole
4,5-dibutylnaphthotriazole
4-methyl-8-phenylnaphthotriazole
6-nitro-7-p-methylphenylnaphthotriazole
4-chloro-naphthotriazole
6-fluoro-naphthotriazole
7,8-dibromonaphthotriazole
4-cyclobutylnaphthotriazole
5-cyclopentylnaphthotriazole
Aziminophenazine
4-methylaziminophenazine
4-methyl-11-methylaziminophenazine
4-decylaziminophenazine
6-ethylaziminophenazine
6,7-dipropylaziminophenazine
4,6-dinitroaziminophenazine
9,11-dioctylaziminophenazine
4,6-dichloroaziminophenazine
4,6,9,11-tetrafluoroaziminophenazine It is to be understood this this invention encompasses as specific non-limiting examples of corrosion inhibitors any polyvalent metal complex or any metal salt complex of the foregoing benzotriazoles, naphthotriazoles and aziminophenazines.

The benzotriazoles used in preparing the corrosion inhibitors of this invention are prepared by the action of nitrous acid on o-phenylene diamine to form azimidobenzene or aziminobenzene, also called benzo-1,2,3-triazole, a well-crystallized, odorless compound, melting at about 100° C. Aziminotoluene, thusly prepared, melts at 83°–84° C. These compounds are stable towards acids and alkalies and resist oxidation and/or reduction. They form stable metallic salts.

2,3-diaminophenazine is prepared by the oxidation of o-phenylene diamine with ferric chloride in acetic acid solution, from which the triazoles, such as aziminophenazine is prepared through the action of nitrous acid by the reaction

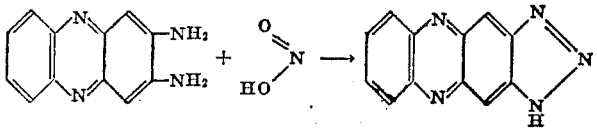

Aziminophenazine also forms innermetallic complexes, e.g., with copper and nickel, to be used in accordance with this invention.

The metal salts that may be used include, by way of illustration, copper sulfate, cobalt sulfate, nickel sulfate, copper chloride, cobalt chloride, nickel chloride, copper bromide, cobalt bromide, copper nitrate, and cobalt nitrate.

The reaction of the benzotriazoles or naphthotriazoles with the foregoing metal salts is readily carried out using known techniques, and the initial formation of the associated complex is observed by the formation of a precipitate. The associated complex with the anion of the metal salt may be used as such, or transformed by heat or alkali to the penetration complex form. The alkali added to promote the formation of the penetration complex form may be ammonium hydroxide, sodium hydroxide, potassium hydroxide, lithium hydroxide, calcium oxide, barium hydroxide, and similar alkalies.

The reaction is carried out at a temperature of about 20° to 100° F., under atmospheric conditions, using equimolar quantities of the benzotriazole or naphthotriazole and metal salt. Preferably, an excess of the metal salt is used and the alkali is added to the reaction mixture slowly with constant stirring.

In order to demonstrate the invention, the following non-limiting examples are given:

The effectiveness of our inhibitors has been demonstrated by a series of experiments with aqueous solutions of "Tide," a commercial detergent composition containing alkylaryl sulfonates, sodium tripolyphosphate, sodium sulfate, and other components. First, a water solution of "Tide" (5.0 g./liter) was prepared. A 50-ml. portion of this detergent solution was charged to each of three flasks. Two polished brass strips (½" x 3") were placed in each of the flasks, and our inhibitors were placed in the indicated concentration in two of the flasks. Air, at a rate of 20–30 ml./min., was bubbled through the solutions for a period of 72 hours while the temperature was held constant at 70° C. The weight losses per strip were as follows:

Table I

| Inhibitor | Conc. of inhibitor (percent w.) | Wt. loss (percent) (avg. of two strips) | Corrosion expressed as inch per year |
|---|---|---|---|
| None | 0.0 | 2.21 | 0.0865 |
| Copper bis-benzotriazole | 0.1 | 0.11 | 0.0035 |
| Nickel bis-benzotriazole | 0.025 | 0.008 | 0.0003 |

As is known, the corrosion rate in inches per year is the significant measure of the inhibiting effect, same being calculated from the weight and size of the strip, its weight loss in grams, the time factor and the density of the metal.

This invention is directed to inhibiting corrosion in aqueous environments in contact with metal surfaces. It has been demonstrated in relation to aqueous solutions of commercial detergents containing builders such as polyphosphates and alkali metal sulfates. The following experiments demonstrate that the presence of these builders, particularly the phosphates, causes the corrosion and that the surfactant agent, i.e., dodecylbenzene sodium sulfonate, itself does not contribute to the corrosion.

In these experiments, pure synthetic dodecylbenzene sodium sulfonate and reagent grade sulfate, phosphate, metasilicate, pyrophosphate and tripolyphosphate salts were used and the procedure in the foregoing experiments was followed:

Table II

| Blend No. | Component | Wt. percent | Corrosion, wt. percent loss | Corrosion, inch/year |
|---|---|---|---|---|
| 1 | DBSS* | 100 gain | 0.25 | |
| 2 | DBSS | 50 gain | 0.11 | |
|   | Sodium sulfate | 60 | | |
| 3 | DBSS | 40 | 0.04 | 0.0009 |
|   | Sodium sulfate | 20 | | |
|   | Trisodium phosphate | 40 | | |
| 4 | DBSS | 40 | 0.07 | 0.0017 |
|   | Sodium sulfate | 20 | | |
|   | Sodium metasilicate | 40 | | |
| 5 | DBSS | 40 | 1.04 | 0.041 |
|   | Sodium sulfate | 20 | | |
|   | Sodium pyrophosphate | 40 | | |
| 6 | DBSS | 40 | 1.33 | 0.001 |
|   | Sodium sulfate | 20 | | |
|   | Sodium tripolyphosphate | 40 | | |

*DBSS—abbreviation for dodecylbenzene sodium sulfonate.

Within this environment, i.e., blend #5, the presence of about 0.2 g. of copper, nickel, or cobalt bis-benzotriazole or mixtures thereof will reduce the corrosion loss to about 0.10 to 0.20 percent wt., equivalent to about 0.006 to 0.012 inch per year. These results are significant since the concentration of pyrophosphate or polyphosphate in the blends tested in Table II are above the concentrations of these builders in commercial detergent compositions, which are about 5 to 20% by weight.

The compounds of this invention are colored solids. The cobalt and nickel complexes are violet, and the copper complexes are red. They are water insoluble and have limited solubility in organic solvents. However, the complexes are sufficiently soluble or dispersible in aqueous media to provide corrosion protection since only about 0.0001 to 0.2 g. per 100 ml. of solution is necessary for this purpose. The presence of detergents, alkalis other salts, organic solvents, etc., in the aqueous media or emulsion aids in solubilizing the compounds of this invention so they can be readily used in, or brought into intimate contact with, aqueous corrosive environments in the foregoing concentrations. The compounds of this invention are soluble to the extent necessary to inhibit corrosion in aqueous detergent compositions having a pH of about 8 to 11.

The compounds of this invention act as corrosion inhibitors for a variety of metals and alloys, e.g., iron, steel, aluminum, brass, copper, and the like which are subject to a corrosive atmosphere in liquid or vapor form. Generally, the presence of air or oxygen in aqueous media greatly increases the rate of corrosion in such environments, particularly if a detergent or surfactant is present. The art recognizes that organic compounds such as amines, mercaptans, heterocyclic nitrogen compounds, substituted ureas and thioureas, etc., containing nitrogen, oxygen, sulfur, and other members of Groups V and VI of the Periodic Table, can be used to inhibit such corrosion. However, the effectiveness of these compounds, the concentrations necessary, and cost and other factors, militate against the use of many of these inhibitors on a commercial basis.

Many commercial detergents contain builders, such as polyphosphates and pyrophosphates, to assist the washing action and prevent the formation of insolubles. Normally, in the use of detergent compositions in machinery such as found in launderies or factories, the coatings of corrosion products and other insolubles form a protective layer on the metal surfaces. The presence of builders or the use of highly effective detergents prevents or removes this coating and promotes corrosion of the metal surfaces.

The innermetallic or associated complex of benzotriazoles of this invention are effective as corrosion inhibitors in aqueous solutions, aerated aqueous solutions, detergent solutions, and aerated detergent solutions to overcome this and related corrosion problems. The detergent compositions with which the corrosion inhibitors of this invention can be used contain any type of detergent, soap, builder or combination of these ingredients.

Although the invention has been illustrated by the use of a mixed aryl alkyl sulfonate detergent composition, it is not to be limited thereto. The corrosion inhibitors of this invention can be used in metal-cleaning compositions, steam cleaners, skin detergents, car-washing compositions, metal-pickling solutions, lubricating oil compositions, cutting oils, grease emulsifiers, low-sudsing all-purpose emulsifier compositions or detergents for household use, dispersant or emulsion paints, latex paints, water-base inks, glues, galvanizing fluxes, electrolyte solutions, agricultural emulsifier formulations, anionic textile softeners, dye baths, warp-sizing compositions, textile- and leather-treating compositions, dishwashing compositions, etc., that is, any of the known detergent- or surfactant-containing compositions. Examples of various surfactants that may be contained in or be present in the aqueous environment to be inhibited by the compounds of this invention are the anionic and cationic surfactants such as dodecylbenzene sulfonic acid, salts of fatty acid tertiary amines, alkyl aryl sulfonate, sulfonated oils, alkyl aryl polyether alcohols, polyglycol esters, disodium N-octadecylsulfosuccinimate, ethanolated alkyl guanidine amine complexes, dihexyl ester of sodium sulfosuccinic acid, fatty carbamide derivatives, petroleum sulfonates, sulfated fatty alcohols, blends of alkalies and detergents, blends of non-ionic and cationic agents, cetyl dimethyl benzyl ammonium chloride, alkyl polyoxyethylene glycol amide, sorbitan monolaurate, sorbitan sesquioleate, and others.

The foregoing synthetic detergents, emulsifiers and surfactants along with ordinary soaps and alkalis including phosphates, carbonates, sulfates, acetates and mixtures of same, wherein the cation may be an alkali metal or an alkaline earth metal, are used in aqueous solutions in. amounts ranging from about 0.1 g. to 10 g./100 ml. of solution, or about 0.001 to 0.2% by weight, having a pH of about 8 to 11, to make up a wide variety of cleaning, scouring, detergent and emulsifier compositions to which the corrosion inhibitors of this invention can be applied or incorporated. The invention also relates to the method of inhibiting the corrosion of metal parts in contact with detergent compositions by incorporating therein a corrosion-inhibiting amount of the compounds of this invention.

In defining the complexes of this invention, particularly the penetration type, it must be kept in mind that the metal, that is, copper, nickel, or cobalt is no longer associated with various anions, such as phosphate, chloride, bromide, iodide, nitrite, sulfate, and nitrate, coming from the metal salt used in its preparation or subsequently added and incorporated through the alkalis that are generally used in detergent compositions as blenders, builders, etc.

Specific examples of other innermetallic complexes that can be prepared by following the examples given herein are:

Copper bis-2-methylbenzotriazole
Nickel bis-2-n-propylbenzotriazole
Cobalt bis-7-decylbenzotriazole
Copper bis-4-chlorobenzotriazole
Nickel bis-4,6-diiodobenzotriazole
Cobalt bis-2-phenylbenzotriazole
Nickel bis-2-nitrobenzotriazole
Nickel bis-2-methoxybenzotriazole
Copper bis-4-pentoxybenzotriazole Specific examples of compounds of the associated type include:

Copper benzotriazole sulfate
Copper benzotriazole chloride
Copper benzotriazole acetate
Copper benzotriazole phosphate
Nickel benzotriazole sulfate
Nickel benzotriazole chloride
Cobalt benzotriazole phosphate
Nickel 2-ethylbenzotriazole sulfate
Cobalt 2-n-butylbenzotriazole chloride
Cobalt 4-bromobenzotriazole bromine
Nickel 2-ethoxy-4-methoxybenzotriazole phosphate Non-limiting examples of specific R and R' groups coming within the definition of this invention are hydrogen, methyl, ethyl, propyl, isopropyl, butyl, isobutyl, t-butyl, amyl, isoamyl, hexyl, heptyl, octyl, nonyl, decyl; the corresponding alkoxy groups such as methoxy, ethoxy, butoxy, propoxy, heptoxy, etc., phenyl, naphthyl, anthryl, phenethyl, phenepropyl, naphthenethyl, tolyl, cyclopropyl, cyclobutyl cyclopentyl, cyclohexyl, cycloheptyl, chloro, bromo, iodo, bluoro, chlorophenyl and the like. In a preferred embodiment of this invention R and R' are substituents of the group consisting of methyl, ethyl, n-propyl, isopropyl, decyl, phenyl, nitro, methoxy, pentoxy and cyclohexyl groups.

Having thus described the invention, the only limitations attaching thereto are found in the appended claims.

The embodiments of this invention in which an exclusive property or privilege is claimed are defined as follows:

1. A composition of matter consisting essentially of an organic surfactant, salts from the group consisting of sodium pyrophosphate and sodium tripolyphosphate, in amount sufficient to cause corrosion of a metal surface when said composition in aqueous medium is contacted with said metal, and an amount sufficient to inhibit corrosion of said metal of inner complexes having the formula

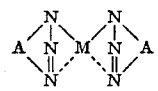

wherein M is from the group consisting of polyvalent metals and salts of metals of the group consisting of cobalt, nickel and copper and A is the same divalent substituent of the group consisting of

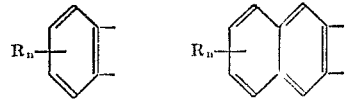

and

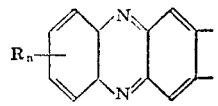

wherein R is a member of the group consisting of halogens, alkyl radicals of 1 to 10 carbon atoms, aryl radicals of 6 to 18 carbon atoms, alkaryl radicals of 6 to 18 carbon atoms in the aryl portion and 1 to 10 carbon atoms in the alkyl portion, aralkyl radicals of 1 to 10 carbon atoms in the alkyl portion and 6 to 18 carbon atoms in the aryl portion and alkoxy radicals having 1 to 10 carbon atoms, and $n$ has a value of 0 to 4.

2. The composition in accordance with claim 1 in which M is a salt of an anion of the group consisting of phosphate, chloride, bromide, iodide, sulfate and nitrate.

3. A composition in accordance with claim 1 in which said surfactant is mixed aryl alkyl sulfonates.

4. A composition in accordance with claim 1 which contains about 5–20% by weight of said salts.

5. The composition in accordance with claim 1 in which the inner complex is present in sufficient amount to provide a concentration of about 0.0001 to 0.2 gram when the composition is mixed with the aqueous medium.

6. The composition in accordance with claim 5 in which A is

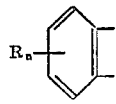

and $n$ is zero.

7. The composition in accordance with claim 5 in which A is

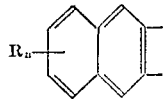

and $n$ is zero.

8. The composition in accordance with claim 5 in which A is

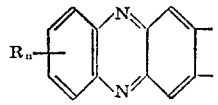

and $n$ is zero.

9. The method of inhibiting corrosion of metal surfaces exposed to aqueous surfactant-containing compositions having a pH of about 8 to 11 comprising contacting such surfaces with such compositions in the presence of not less than about 0.0001 gram/100 ml. of aqueous composition but sufficient to inhibit corrosion of said surfaces, of innermetallic complexes having the formula

wherein M is from the group consisting of polyvalent metals and salt of metals of the group consisting of cobalt, nickel and copper and A is the same divalent substituent of the group consisting of

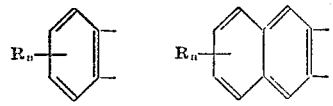

and

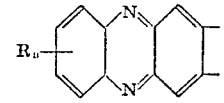

wherein R is a member of the group consisting of halogens, alkyl radicals of 1 to 10 carbon atoms, aryl radicals of 6 to 18 carbon atoms, alkaryl radicals of 6 to 18 carbon atoms in the aryl portion and 1 to 10 carbon atoms in the alkyl portion, aralkyl radicals of 1 to 10 carbon atoms in the alkyl portion and 6 to 18 carbon atoms in the aryl portion and alkoxy radicals having 1 to 10 carbon atoms, and $n$ has a value of 0 to 4.

10. The method in accordance with clam 9 in which the aqueous medium contains compounds from the group consisting of sodium pyrophosphate and sodium tripolyphosphate in sufficient amount to cause corrosion of the metal.

11. The method in accordance with claim 10 in which the innermetallic complexes are present in an amount of about 0.0001 to 0.2 gram/100 ml. of aqueous medium.

12. The method in accordance with claim 11 in which A is

13. The method in accordance with claim 11 in which A is

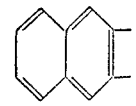

14. The method in accordance with claim 11 in which A is

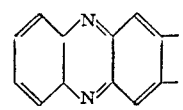

References Cited by the Examiner

UNITED STATES PATENTS

| | | | |
|---|---|---|---|
| 2,406,692 | 8/1946 | Jones et al. | 252—390 XR |
| 2,618,606 | 11/1952 | Schaeffer et al. | 252—137 |
| 2,618,608 | 11/1952 | Schaeffer et al. | 252—390 XR |
| 2,784,183 | 3/1957 | Keller et al. | 260—308 XR |
| 2,868,798 | 1/1959 | Kehr | 260—299 |
| 2,870,092 | 1/1959 | Ruff | 252—137 |
| 2,870,093 | 1/1959 | Ruff | 252—137 |
| 2,881,176 | 4/1959 | Hogsett | 260—299 |
| 2,941,953 | 6/1960 | Hatch | 252—390 XR |
| 3,054,800 | 9/1962 | Burchfield et al. | 260—299 |

JULIUS GREENWALD, *Primary Examiner.*